United States Patent [19]

Eggers

[11] 3,807,222

[45] Apr. 30, 1974

[54] ULTRASONIC METHOD OF DETERMINING CHEMICAL RELAXATION CHARACTERISTIC OF SOLUTIONS AND MEASURING CELL THEREFOR

[75] Inventor: Frieder Eggers, Bovenden, Germany

[73] Assignee: Max-Plank-Gesellschaft zur Foerderung der Wissenschaften e.V., Bunsenstrasse, Germany

[22] Filed: Oct. 19, 1972

[21] Appl. No.: 298,988

[30] Foreign Application Priority Data
Oct. 22, 1971 Germany............................ 2152805

[52] U.S. Cl................................. 73/67.2, 73/67.6
[51] Int. Cl. ............................................ G01n 29/00
[58] Field of Search ............ 73/61, 61.1, 67.1, 67.5, 73/67.6, 67.2

[56] References Cited
UNITED STATES PATENTS
| | | |
|---|---|---|
| 2,755,662 | 7/1956 | Swengel.............................. 73/67.6 |
| 3,359,788 | 12/1967 | Colvin................................. 73/67.1 |
| 2,966,056 | 12/1960 | Heller ................................. 73/61 R |
| 3,359,787 | 12/1967 | Zemanek ............................ 73/61 R |

Primary Examiner—Richard C. Queisser
Assistant Examiner—Arthur E. Korkosz
Attorney, Agent, or Firm—Flynn & Frishauf; William R. Woodward

[57] ABSTRACT

A sample of solution is contained between opposed quartz crystal discs, one of which excites ultrasonic waves, and the other of which measures the amplitude of a standing wave pattern at or near resonance of the cell. The resonance curve is compared with that of a reference liquid preferably having the same sound transmission velocity. A pulse method is used for higher frequencies up to 150 MHz. The cell is made of two thick plates with an annular gasket and has adjustments for assuring parallelism of the crystals. The crystals are seated over cavities in the mounting plates, which provide air backing. Channels are provided for circulating a temperature regulating medium.

10 Claims, 3 Drawing Figures

ULTRASONIC METHOD OF DETERMINING CHEMICAL RELAXATION CHARACTERISTIC OF SOLUTIONS AND MEASURING CELL THEREFOR

This invention relates to a method for determining the chemical relaxation characteristic of a material in solution by measuring the solution's frequency dependent absorption of ultrasonic wave energy generated by a piezoelectric crystal. The invention further concerns a measuring cell for such determinations.

It is known as a matter of chemical kinetics to investigate chemical relaxation by distrubing the equilibrium periodically by the energy field of ultrasonic waves. The phase delayed reaction of the system to the changes of the disturbed condition variables produced by the ultrasonic waves, hence involving the usual sinusoidal pressure variations and sometimes also temperature variations, is related to absorption of the sonic energy. This absorption is a function of the frequency in a characteristic way and enables conclusions to be drawn regarding particular properties of the chemical or physicochemical system. It is possible, for example, to determine the temperature dependence of the reaction volume ($\Delta V$) and, in non-aqueous solutions, of the reaction enthalpy (heat content $\Delta H$) and especially the respective relaxation time. The ultrasonic absorption is at the same time related to a typical dispersion of the sound velocity, which likewise can be used to determine relaxation times, but is more difficult to measure.

Ultrasonic methods extend the range and reliability of other known procedures of chemical kinetics, as for example temperature jump and pressure jump methods, particularly in the case of relaxation times less than one microsecond. An advantage is that ultrasonic investigations are possible in organic solvents, which are electrically nonconducting. Even in this case, optical absorption plays no part in the ultrasonic methods. Ultrasonic absorption measurements have heretofore been possible only with substantial experimental expense and have required large quantities of the liquids involved, particularly in the frequency range below 5 MHz.

It is accordingly an object of this invention to provide a method of determining the damping factor and also the sound velocity for ultrasonic waves in liquids over a large frequency range, which can be carried out at small expense and with small test sample. It is a further object of the invention to provide a measuring cell particularly suited for such a method.

SUBJECT MATTER OF THE PRESENT INVENTION

Briefly, a solution of the material to be examined is made to fill a liquid tight test chamber, most of the volume of which lies between two substantially parallel piezoelectric crystal plates. Using one of the crystal plates as an ultrasonic wave generator and the other to detect the response of the solution, the frequency of the waves is varied and an amplitude-frequency curve is prepared, from which relaxation data can be readily derived by comparison with a similar curve obtained with a reference liquid which is preferably chosen to provide for the same velocity of transmission of ultrasonic waves. Frequencies of peak response are related to the velocity of wave propagation, and the width of the resonance curve in the neighborhood of such peak response is related to the absorption.

The liquid tight container, which as just mentioned has opposed walls formed by parallel quartz crystal plates constitutes a measuring cell. The quartz plates are mounted a fixed distance apart in a manner which provides for some relative angular adjustment in order to assure parallelism. In particular this is accomplished by making the housing of the chamber in two halves, preferably symmetrical with respect to the median plane between the two crystals, with an annular gasket that is sufficiently compressible to permit the parallelism adjustment to be made by screw fastening members joining the two halves of the housing. The crystal plates are seated at the orifice of cavities in the housing into and through which electrical connections are brought. The cell is preferably kept at a regulated temperature by circulating a thermostatically regulated fluid through channels in the housing provided for the purpose.

The invention will be described by way of example with reference to the accompanying drawings, wherein.

Figure 1:
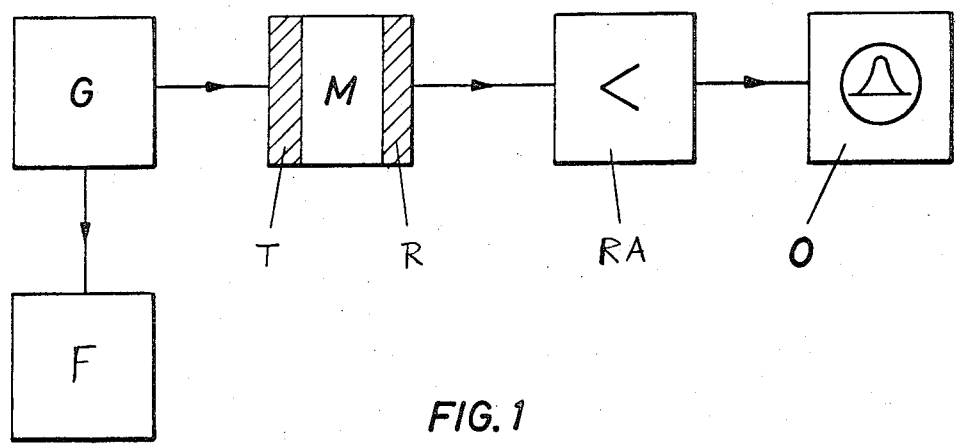
FIG. 1 is a simplified block diagram of apparatus for measuring chemcial relaxation effects with ultrasonic standing waves in a liquid sample in accordance with the invention.

In the arrangement of apparatus shown in FIG. 1, the transmitting quartz crystal T of a schematically represented measuring cell M is driven by a tunable signal generator G. The transmitting crystal produces a continuing level of ultrasonic energy in the liquid contained in the measuring cell, in this example forming a standing wave pattern in the neighborhood of certain frequencies. The amplitude of this sound energy field is measured by the receiving crystal R of the measuring cell, which is electrically coupled to a tunable receiving amplifier RA. The output signal of the amplifier RA is furnished to an indicator apparatus such as the oscillograph O, which displays the signal. For indication of the operating frequency of sine wave generator G, a frequency meter F is provided.

Figure 2:
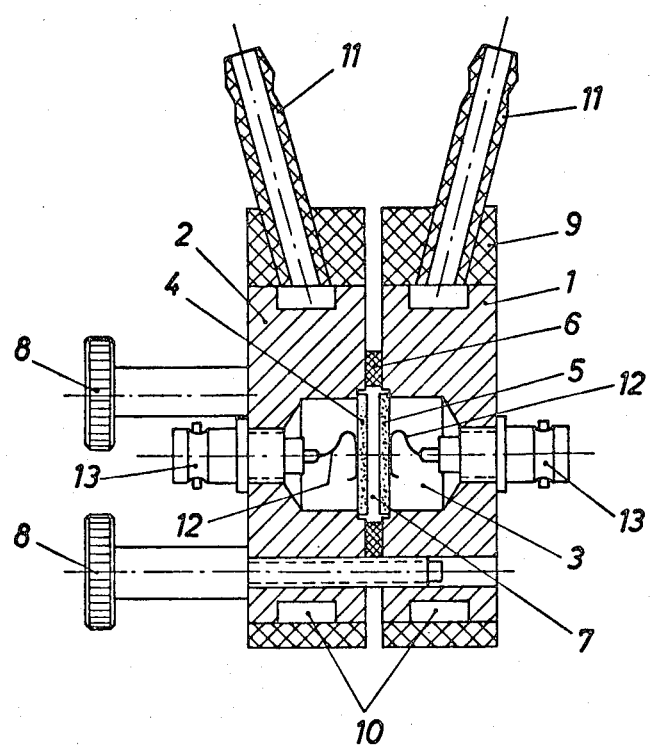
FIG. 2 is a preferred form of measuring cell in accordance with the invention.

A preferred form of construction of the measuring cell M is shown in diagrammatic cross-section in FIG. 2, approximately in actual size. It comprises a housing having two main members 1 and 2 in the form of thick plates which in this example are of cylindrical contour and held together at a relatively small distance from each other in coaxial position. Each of these main pieces of the housing has an axial cylindrical cavity 3 on its inwardly facing side. The cavities 3 are covered by disc shaped crystal plates, the transmitting quartz crystal 4 being seated at the inner surface of housing member 2 and the similar receiving quartz 5 being seated at the inner surface of the other housing member 1. The two quartz crystals are mounted on the edge of the respective cavities 3 by a liquid tight joint by means of an adhesive or in some other fashion. By means of this mounting over the empty cavities 3, the quartz crystals can vibrate freely on their rear surfaces (an arrangement also known as "air backing"). Between the housing members 1 and 2, a ring gasket 6 of rubber or of a similar elastic material is inserted, coaxially surrounding the quartz crystals 4 and 5. As may be seen in FIG. 2, the quartz crystals 4 and 5 and the ring gasket 6 enclose a flattened measuring chamber 7 which can be filled with the liquid to be examined, using filling means not shown in the drawing, for example tubular passages or similar conduits opening into the chamber between the gasket and one or the other of the quartz crystals. The measuring chamber 7 is liquid tight and preferably insert towards solvents of all types.

The two parallel housing members 1 and 2 are held together by three adjusting screws 8, each parallel to the axis of the measuring chamber and all distributed around that central axis and the gasket 6 with equal angular separation, in such a manner that the gasket is elastically compressed in a springy condition. The adjusting screws 8 pass through one housing member 2 and engage corresponding tapped holes in the other housing member 1, so that by adjustment of the screws the two housing members, and with them the quartz crystals 4 and 5 mounted on them, can be angularly adjusted with respect to each other. In this fashion it is possible to set the two quartz crystals exactly parallel to each other. The distance between the quartz crystals is essentially fixed on account of the compressibility limit of the gasket 6. This distance amounts to approximately 3 to 10 mm. in the measuring cell shown in FIG. 2.

Ring shaped channels 10 are provided in the outer circumference of the two housing members 1 and 2 which are surrounded by a thermally insulating shell 9. A thermostatically controlled liquid circulates in the channels 10 for purposes of thermal regulation, being supplied to the channels 10 and drawn therefrom by connecting nipples 11, only one of which is shown on each side of the housing.

The quartz crystals 4 and 5 that serve as ultrasonic transducers are X-cut crystal plates operating in the so-called thickness mode of vibration. They must be made with the highest precision, i.e. with exactly plane and parallel surfaces, so as not to impair the standing wave pattern produced, in accordance with this embodiment of the invention, by multiple reflections (these conditions must be precisely held in every type of interferometer). For the same reason the quartz surfaces must not be bent in the slightest in mounting them in the measuring cell, for instance in fastening them over the cavities 3.

Contacts for electrical connection of the quartz crystals are provided on the front or inner sides and on their backsides facing the cavities 3. On the front side, they consist of silver bridges (not shown) grounded to the metallic body of housing member 1 or 2, as the case may be. On the rear sides, the connections are provided by thin wires 12 resting against the back surfaces of the quartz crystals. The wires 12 lead across the cavities 3 to high frequency type connection bushings 13 (e.g., BNC bulkhead receptacles), which are screwed into the housing members 1 and 2 from the outside and penetrate into the cavities 3.

Measurement with the apparatus shown in FIG. 1 is carried out in the following manner. The liquid to be examined is, to the extent necessary, filtered and degassed and the measuring cell is then filled with it with care to avoid the presence of bubbles. The measuring chamber is brought to a suitable stable temperature condition by means of the temperature regulating circulation system, and the temperature is thereafter kept constant during the course of the measurements. Temperature variations should so far as possible be held to less than 0.01°C, because the sound velocity in many liquids is temperature dependent, so that temperature gradients in the measuring chamber lead to a distortion of the standing wave pattern. The tunable sinusoidal generator G is now switched on and, at particular frequencies, a standing wave pattern is produced in the liquid. The adjusting screws 8 of the measuring cell are then adjusted to bring the quartz crystals into exact parallelism to each other, as verified by the fact that an output amplitude maximum is observed at the receiving quartz crystal.

The amplitude of the standing wave pattern produced is now measured with receiving quartz crystal R as a function of the controllable frequency of the sine wave generator G in a series of measurements, the amplitude being displayed by the oscillograph O or a suitable measuring instrument. Since the liquid and the quartz crystals form a resonant circuit, resonance maxima of the output voltage of the receiving quartz crystal appear. Measurement is carried out to selected frequencies, avoiding frequency values near the fundamental crystal frequency $f_Q$ and its harmonics $2f_Q$, $3f_Q$, etc. By measurement of the half-value width $\Delta f$ of the output amplitude resonance curves so found, the Q value, sometimes referred to as the quality factor of a resonator, can be determined as a function of frequency for the resonator system of the measuring cell. The half-value width $\Delta f$ is the width of the resonance curve at an amplitude down by 3 dB from the maximum value.

The measurements are carried out on the solution under investigation and right afterwards they are repeated on a corresponding selected reference liquid of similar sound propagation velocity. The solvent used in the solution being investigated is preferably used as the reference liquid, with a suitable inert additive to match the sound velocity. When the same sound velocity holds for the test sample and the reference liquid, the ultrasonic wave patterns in the measuring cell will be identical.

The fact that by the method here described, only relative measurement of sound absorption compared to that of a reference liquid are possible does not amount to any disadvantage in practice, because normally only the excess absorption is of interest. A reference solution with precisely known properties is readily found.

The desired value of absorption per wave length is then calculated from the measured quality factor Q and then can be plotted on a graph with a logarithmic scale, as a function of the likewise logarithmically scaled frequency. For a simple relaxation process, the result of that procedure is a "Debye curve," which may be described by the equation:

$$\alpha\lambda = A\ \omega\tau/1 + (\omega\tau)^2 .$$

in which A is a constant and $\tau$ is the relaxation time. The maximum of this curve is found at the angular frequency $\omega = 1/\tau$.

From the frequencies of these resonance maxima, the sound velocity in the test liquid can be determined, since the distance between the quartz surfaces limiting the resonance cavity is known, and the number of standing half waves formed in the resonance cavity can be calculated from the resonance frequency, so that the required values of frequency and wave length are available for determination of the sound velocity. The method here described has important advantages. In particular, significantly smaller test samples are required than in the case of heretofore known procedures. The lower frequency limit and the realizable measurement accuracy depend upon the dimensions of the measuring chamber and upon the diameter of the quartz crystal plates. At relatively small expense, precise measurements are possible even in the frequency region around 1 MHz, in which heretofore experimental difficulties arose. The precision of measurement is increased if, for a given measuring cell, measurements can be carried out at a large number of measurement frequencies of interest over a broad frequency region.

The measuring cell described above is very simple in construction and is usable over a wide range of temperatures. The electrical equipment expense for the measuring system of this invention is also small. It is limited to the provision of commercially available equipment that is also applicable for other laboratory tasks (for example for dielectric measurement and investigation). A particular advantage of the relative measurements lies in the fact that it is not necessary to introduce calculated correction values for diffraction phenomena in the ultrasonic field, as has been necessary particularly in measurement procedures heretofore used in the frequency region below 5 MHz.

Relaxation investigation by measurement of ultrasonic absorption is, in general, meaningful only if it can be carried out over a large frequency region. Even a simple Debye curve, which corresponds to a single step relaxation process, has bandwidth of about one decade. Above 30 MHz the damping factor (attenuation) of the propagation of ultrasonic energy in liquids is, as a rule, so high that the resonance method above-described is no longer suitable. Another illustrative example of the invention, shown in block diagram in FIG. 3, makes possible ultrasonic measurements up to 150 MHz. This example involves a pulse method by which the same preferred measurement cell, shown in FIG. 2, can be used.

In the arrangement of this example, a pulse modulated signal generator $G'$ produces a pulse of a suitable carrier frequency, thus a short train of carrier frequency oscillations, which is simultaneously applied to the transmitting quartz crystal T and to a calibrated adjustable precision attenuation path A. The output of the measuring cell M and of the attenuator A are alternately connectable to a receiver $R'$ by a coaxial type switch S for selective connection of the latter. The receiver $R'$ is tunable and has a band width of about 1 MHz. After demodulation of the pulse, the respective output signal (envelope) is displayable on an oscillograph O coupled to the receiver and triggered by the signal generator $G'$. The ultrasonic impulse propagated from the transmitting crystal to the receiving crystal through the liquid can, for example, have a pulse duration of about 10 micro-seconds.

The amplitude A of a plane wave in a liquid undergoes damping according to the exponential law:

$$A = A_o \cdot e^{-\alpha x}$$

In the procedures heretofore used, the damping parameter is obtained by variation of the wave path length. In the method here described, on the other hand, the extra absorption per wave length $\alpha \cdot \lambda$ is found with a fixed distance between the transducers by means of a comparison measurement with a suitable reference liquid. The measurements result in departures from the resonance method exactly at the odd numbered overtones (harmonics) of the quartz crystal fundamental frequency, thus for example at 15,25,35,45 etc. MHz in the case of a 5 MHz quartz crystal. The amplitude of the electrical pulses produced by the receiving crystal R is compared with the output signal of the continuously adjustable precision attenuator A. This is done first for the test liquid under examination and then for the selected reference liquid. From the differences of the adjustments of the attenuator for amplitude equality with the output of the receiving crystal for the test and reference liquids, the extra absorption per wave length $\alpha \cdot \lambda$ can be calculated, so that an extension of the results of the resonance method is obtained for the broader frequency range.

If it is desired to avoid determination of the sound velocity $c$, it is necessary in that case to measure the fundamental frequency of the cell: $f_o = c/2x$, where $x =$ distance between the crystals. In case the test and reference liquid differ markedly in their characteristic impedance for sound $Z = \rho c$, where $\rho =$ density, it is possible by taking account of this mismatch to obtain a further corrected value for the calculation of $\alpha \cdot \lambda$. Both of these completing measurements can be simply carried out with the measuring equipment here described.

Figure 3:
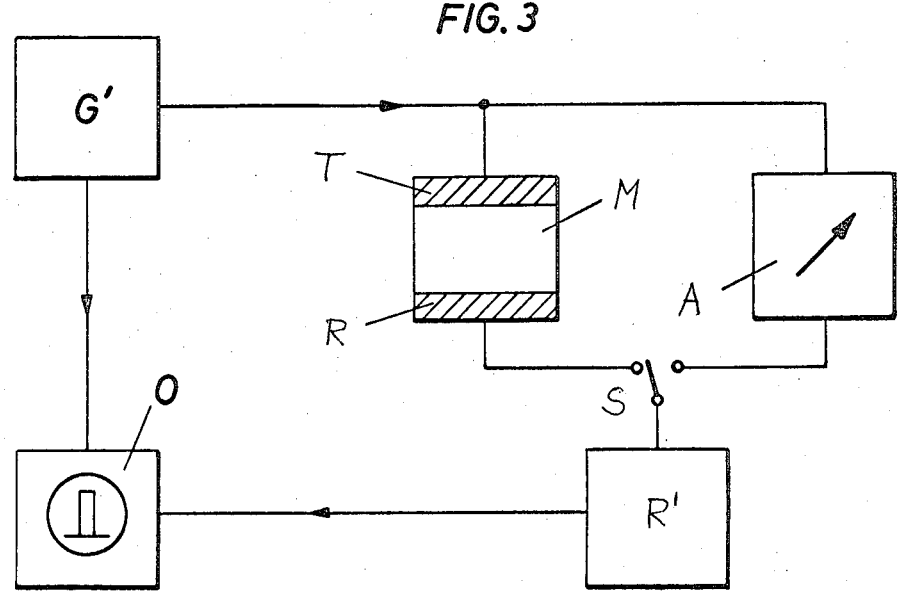
FIG. 3 is a simplified block diagram of another arrangement of apparatus for measuring chemical relaxation effects, in this case with pulses of ultrasonic waves.

In the measurement exemplified by the equipment layout of FIG. 3, the necessary test sample size is again only about 1 ml. A measuring cell of the type and size set forth in FIG. 2 is well suited for measurements by this method in the frequency range from about 15 to 150 MHz. Driving voltages under 10 V. are as a rule sufficient for the transmitting crystal. Precision attenuators (so-called piston attenuators) make possible an amplitude resolution of the output signal of about 0.02 dB in the specified frequency range.

The methods described above are particularly well-suited for the examination of phenomena involving relaxation times less than 1 micro-second. The energy densities occurring in the measurement are so small (less than 1 $\mu$W/cm$^2$) that they cannot modify the solution, as by warming or cavitation.

Although the invention has been described by reference to specific examples, it will be understood that variations and modifications are possible within the inventive concept without departing from the spirit of the invention. For example x-cut crystals are preferred for exciting and receiving the waves in the liquid. It is possible to use other crystal cuts, and there may be other situations in which other piezoelectric materials might find application. Also, the frequency of the wave generator and of the receiver tuning could be scanned in synchronism in order to cause the oscillograph to display the relation of amplitude to frequency.

I claim:

1. An ultrasonic wave method of measuring the chemical relaxation characteristic of a material in solution comprising:

establishing, in a confined quantity of a solution of said material, ultrasonic waves between two substantially parallel piezoelectric crystal plates of which one is excited into ultrasonic vibrations and the other responds thereto to provide an electrical indication of the amplitude of waves impinging thereon;

varying the frequency of said waves between said plates and measuring the corresponding amplitude by means of said amplitude indication, said frequency variation including variation in the neighborhood of a frequency at which a standing wave pattern is established between said plates;

using the amplitude measurements to determine the width of the resonance peak related to said standing wave pattern;

performing the above steps with a reference liquid not containing said material but otherwise similar at least in terms of velocity of ultrasonic wave propagation, and comparing the resonant peak width determination for the two liquids to determine the effect of chemical relaxation.

2. A method as defined in claim 1 in which the frequency of said waves is in the frequency region between about 0.2 and 30 MHz.

3. A method as defined in claim 1 in which said plates are separated by a distance less than their largest diameter or diagonal.

4. A method as defined in claim 3 in which said plates are separated by a distance substantially less than their smallest diameter or diagonal.

5. An ultrasonic wave method of measuring the chemical relaxation characteristic of a material in solution comprising:

establishing, in a confined quantity of a solution of said material, ultrasonic waves between two substantially parallel piezoelectric crystal plates of which one is excited by a signal source so as to generate pulse modulated trains of waves and the other responds thereto to provide an electrical indication of the amplitude of waves impinging thereon;

varying the frequency of said waves between said plates and measuring the corresponding amplitude by means of attenuation means connected to said signal source for comparison of the output of said signal source with said amplitude indication of said responding plate;

performing the above steps with a reference liquid not containing said material but otherwise similar at least in terms of velocity of ultrasonic wave propagation, and comparing the amplitudes obtained for the two liquids with respect to frequency to determine the effect of chemical relaxation.

6. A method as defined in claim 5 in which said frequency of said waves is in the frequency region between 15 and 150 MHz.

7. A measurement cell adapted for measuring the chemical relaxation characteristic of a liquid, comprising a liquid tight housing enclosing a liquid tight cavity having two opposed parallel walls constituted respectively by a transmitting and a receiving piezoelectric crystal, said housing including a flexible median gasket and means for adjustably compressing said gasket and thereby establishing parallelism of said crystal plates.

8. A measuring cell as defined in claim 7 in which said housing comprises two plate like members 1, 2 each containing a cavity 3 so disposed that when said members are assembled, the said cavities are respectively aligned on a common axis transverse to said members and in which said piezoelectric crystal plates cover said respective cavities in a liquid tight manner, said members being arranged to be assembled with an annular gasket 6 coaxial with said crystal plates to define with said crystal plates a measuring cavity and being equipped with at least three adjusting screw means parallel to said axis adapted for assuring parallelism between said crystal plates.

9. A measuring cell as defined in claim 8 in which electrical connection conductors 12 provided with external high frequency type coaxial connectors 13 are arranged in said housing members 1, 2 for connection to said crystal plates 4, 5 in said respective cavities 3.

10. A measuring cell as defined in claim 7 in which said housing is provided with circulation channel system 10 for a thermally stabilizing heat transfer medium.

* * * * *